(12) United States Patent
Dinh et al.

(10) Patent No.: US 10,999,393 B2
(45) Date of Patent: May 4, 2021

(54) CLOUD BROKER FOR CONNECTING WITH ENTERPRISE APPLICATIONS

(71) Applicant: Dell Products L.P., Round Rock, TX (US)

(72) Inventors: Hung Dinh, Austin, TX (US); Kiran Kumar Pidugu, Hyderabad (IN); Sabu Syed, Austin, TX (US); Panguluru Vijaya Sekhar, Bangalore (IN); Vellore Mohammed Imran, Bangalore (IN); Sanitha Muttil, Bangalore (IN); Sean Creedon, Ballincollig (IE)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 16/294,400

(22) Filed: Mar. 6, 2019

(65) Prior Publication Data
US 2020/0287982 A1 Sep. 10, 2020

(51) Int. Cl.
*H04L 29/08* (2006.01)
*G06N 20/20* (2019.01)

(52) U.S. Cl.
CPC ......... *H04L 67/2809* (2013.01); *G06N 20/20* (2019.01); *H04L 67/10* (2013.01)

(58) Field of Classification Search
None
See application file for complete search history.

(56) References Cited

U.S. PATENT DOCUMENTS

| | | | |
|---|---|---|---|
| 2011/0314082 A1* | 12/2011 | Koneti | G06F 9/5055 709/203 |
| 2013/0262678 A1* | 10/2013 | Tung | H04L 41/5016 709/226 |
| 2016/0323381 A1* | 11/2016 | Huang | H04L 67/1097 |

(Continued)

OTHER PUBLICATIONS

Wikipedia, "Properties," https://en.m.wikipedia.org/wiki/.properties, downloaded Jan. 29, 2019, 8 pages.

(Continued)

*Primary Examiner* — Mohamed Ibrahim
(74) *Attorney, Agent, or Firm* — Ryan, Mason & Lewis, LLP

(57) ABSTRACT

An apparatus in one embodiment comprises at least one processing platform comprising a plurality of processing devices. The processing platform is configured to abstract a plurality of partner platforms and a plurality of enterprise applications to extract a plurality of connectivity parameters associated with respective ones of the partner platforms and the enterprise applications, to manage connections between the partner platforms and the enterprise applications by implementing connectivity parameters, wherein the implementing provides the partner platforms with centralized access to the enterprise applications via a broker layer, to select one or more of the connectivity parameters to be used in connection with routing of data between a given partner platform and a given enterprise application, and to route the data between the given partner platform and the given enterprise application via the broker layer using the selected one or more connectivity parameters.

20 Claims, 11 Drawing Sheets

(56) References Cited

U.S. PATENT DOCUMENTS

2019/0132410 A1* 5/2019 Kuzkin .............. H04L 67/2809
2019/0140926 A1* 5/2019 Nayak ................ H04L 43/0811

OTHER PUBLICATIONS

Wikipedia, "Abstraction (Computer Science)," https://en.wikipedia.org/wiki/Abstraction_(computer_science), Nov. 26, 2018, 9 pages.
Adam C. Uzialko, "What is B2B?" Business News Daily, https://businessnewsdaily.com/5000-what-is-b2b.html, downloaded Jan. 23, 2019, 9 pages.
IBM Knowledge Center, "WebSphere MQ Queue Managers," https://www.ibm.com/support/knowledgecenter/en/SSFKSJ_7.1.0/com.ibm.mq.doc/fa10450_.htm, downloaded Jan. 29, 2019, 4 pages.
Amazon API Gateway, "Monitor API Execution with Amazon CloudWatch," https://docs.aws.amazon.com/apigateway/latest/developerguide/monitoring-cloudwatch.html, downloaded Jan. 28, 2019, 1 page.
Fujitsu Glovia, Inc., "Order Management Module," https://www.glovia.com/glovia-om/salesforce-erp-modules/salesforce-order-management-module/, downloaded Jan. 25, 2019, 6 pages.
Ballerina, "Pass-Through Messaging," https://github.com/ballerina-guides/pass-through-messaging.git, downloaded Jan. 29, 2019, 17 pages.
Wikipedia, "RosettaNet," https://en.wikipedia.org/wiki/RosettaNet, Jun. 25, 2018, 2 pages.
Software AG, "Agility for the Digital Enterprise," webMethods, White Paper, Feb. 2018, 8 pages.
Software AG, "Integration Cloud," webMethods, Feb. 2018, 1 page.
Techopedia Resources, "Business-to-Business Gateway," https://www.techopedia.com/definition/31041/business-to-business-gateway, downloaded Jan. 28, 2019, 2 pages.
NGINX, "What is an API Gateway?" https://www.nginx.com/learn/api-gateway/, downloaded Jan. 28, 2019, 4 pages.
Margaret Rouse, "What is API Gateway?" https://whatis.techtarget.com/definition/API-gateway-application-programming-interface-gateway, downloaded Jan. 28, 2019, 4 pages.
Vangie Beal, "Synchronous Messaging," https://www.webopedia.com/TERM/synchronous-messaging.html, downloaded Jan. 29, 2019, 5 pages.
Wikipedia, "B2B Gateway," https://en.wikipedia.org/wiki/B2B_Gateway, Feb. 4, 2016, 1 page.

* cited by examiner

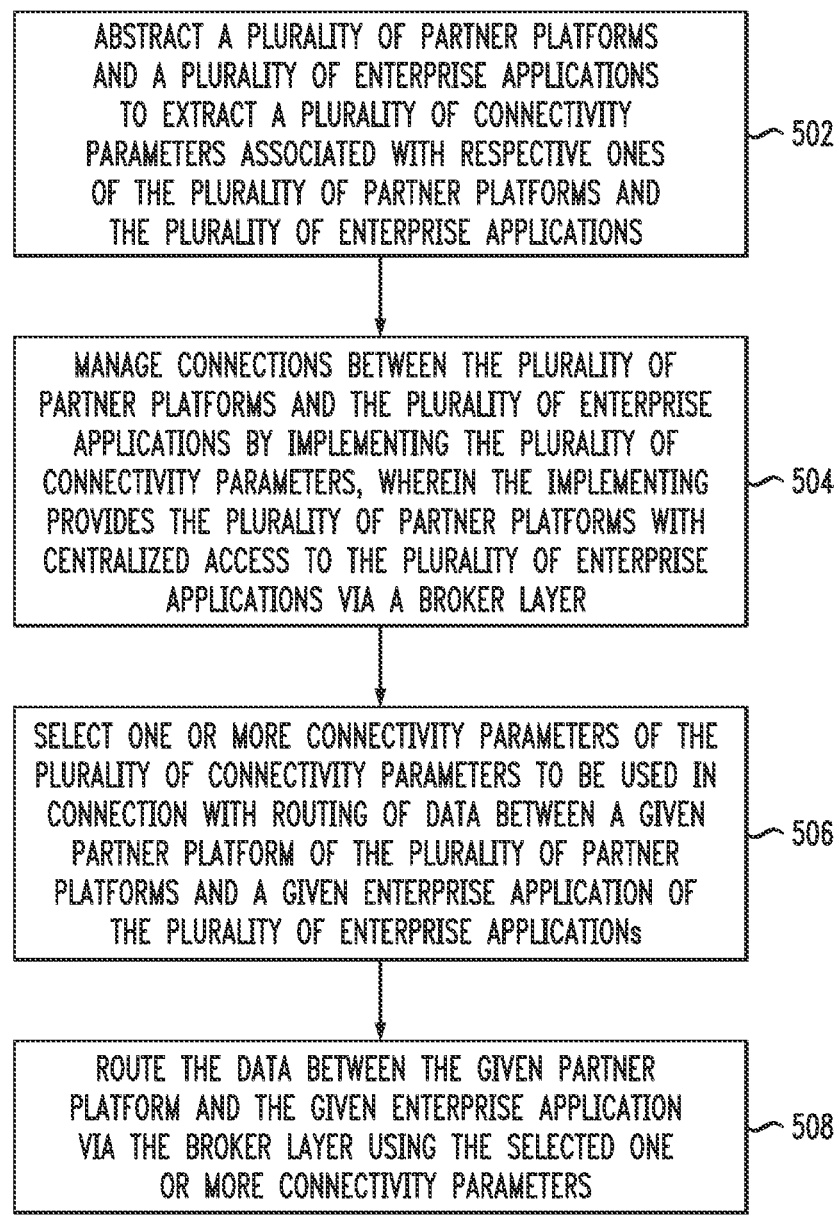

FIG. 6
600

| POST | /api/control | | | ResponseEntity |
|---|---|---|---|---|

Response Class (Status 200)
OK

Model | Model Schema

```
{
  pass_through: "String",
  map: "String",
  Synchronous: "String"
}
```

Response Content Type [ "/" ▼ ]

Parameters

| Parameter | Value | Description | Parameter Type | Data Type |
|---|---|---|---|---|
| | ``` { pass_through: "String", map: "String", Synchronous: "String" } ``` | | body | Model \| Model Schema ``` { pass_through: "String", map: "String", Synchronous: "String" } ``` |

Parameter content type: [ application/json ▼ ]

FIG. 7
700

| POST | /api/transport | ResponseEntity |

Response Class (Status 200)
OK

Model | Model Schema

```
{
SFTP: "String",
MAL: "String",
AS2: "String",
FTP: "String",
https: "String",
}
```

Response Content Type [ "/" ▼ ]

Parameters

| Parameter | Value | Description | Parameter Type | Data Type |
|---|---|---|---|---|
| | ``` { SFTP: "String", MAL: "String", AS2: "String", FTP: "String", https: "String", } ``` Parameter content type: [application/json ▼] | | body | Model | Model Schema ``` { SFTP: "String", MAL: "String", AS2: "String", FTP: "String", https: "String", } ``` |

FIG. 8
800

| POST | /api/profile | | | ResponseEntity |

Response Class (Status 200)
OK

Model | Model Schema

```
{
  partner_name: "String",
  delivery_path: "String",
  partner_id: "String"
}
```

Response Content Type [ "/" ▼ ]

Parameters

| Parameter | Value | Description | Parameter Type | Data Type |
|---|---|---|---|---|
| | ``` { partner_name: "String", delivery_path: "String", partner_id: "String" } ``` Parameter content type: [ application/json ▼ ] | | body | Model \| Model Schema ``` { partner_name: "String", delivery_path: "String", partner_id: "String" } ``` |

FIG. 9
900

| POST | /api/visibility | | | ResponseEntity |

Response Class (Status 200)
OK

Model | Model Schema

```
{
  storage_name: "string",
  correlation_req: "Boolean",
  ann_req: "Boolean"
}
```

Response Content Type [ "/" ▼ ]

Parameters

| Parameter | Value | Description | Parameter Type | Data Type |
|---|---|---|---|---|
| | ``` { storage_name: "string", correlation_req: "Boolean", ann_req: "Boolean" } ``` Parameter content type: [application/json ▼] | | body | Model \| Model Schema ``` { storage_name: "string", correlation_req: "Boolean", ann_req: "Boolean" } ``` |

FIG. 10A
1001

```
//Step1 Load host, channel, port and queue name from Properties file
FileInputStream inputStream = new FileInputStream(propFileName);
properties.load(inputStream);
prop = properties;
host = prop.getProperty("host");
chlName = prop.getProperty("chlName");
port = Integer.parseInt(prop.getProperty("port"));
qMgrName = properties.getProperty("qMgrName");
outputQueueName = properties.getProperty("outputQueueName")
```

FIG. 10B
1002

```
//Step2 set MQEnvironment equal to the loaded values from above
   MQEnvironment.hostname = host;
   MQEnvironment.channel = chlName;
   MQEnvironment.port = port
```

FIG. 10C
1003

```
//Step3 Instantiate an instance of qmgr
   MQQueueManager qMgr = new MQQueueManager(qMgrName)
```

```
//Step4 define openOptions for Put/Get
  int openOptions = MQConstants.MQOO_OUTPUT |
        MQConstants.MQOO_FAIL_IF_QUIESCING |
        MQC.MQOO_INQUIRE | MQC.MQOO_BROWSE
```

```
//Step5 Instantiate an instance of MQPutMessageOptions
  MQPutMessageOptions pmo = new MQPutMessageOptions()
```

```
//Step6 set MQ msg Header to persistent, UTF-8 and string format
  xmlMsg.persistence = MQConstants.MQPER_PERSISTENT;
  xmlMsg.format = MQConstants.MQFMT_STRING;
  xmlMsg.encoding = 546;
  xmlMsg.characterSet = 1208
```

```
//Step7 to instantiate access object to q
  MQQueue defaultQ = qMgr.accessQueue(outputQueueName,
              openOptions,
              null,//default q manager
              null,//no dynamic q name
              null);//no alternate user
```

```
//Step8 MQ API to put to q
  defaultQ.put(xmlMsg,pmo)
```

```
//Step9 close output queue
  outputQueue.close()
```

```
//Step10 Disconnect qmgr
  qMgr.disconnect()
```

CLOUD BROKER FOR CONNECTING WITH ENTERPRISE APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to computing environments, and more particularly to techniques for connectivity in such environments.

BACKGROUND

Business-to-business (B2B) refers to commercial relationships between businesses. For example, one business may rely on another business for materials for production of a given product, or a business may require the services of another business for operational reasons, such as accounting and payroll. B2B companies offer enterprises services and goods such as, but not necessarily limited to raw materials, manufacturing, data storage and/or cloud services that enterprises may need to operate and profit.

Enterprise functions and objectives are often impeded by heterogeneous application requirements and resulting compatibility and connectivity issues with multiple B2B vendor platforms. For example, in response to changes in their applications and platforms, enterprises may need to work with each B2B vendor to develop workable solutions for interfacing their systems with the inconsistent and diverse protocols and configurations used by their B2B partners. The need for the organizations to adapt to various inflexible vendor configurations, requires large expenditures of computer and personnel resources to develop compatibility solutions.

SUMMARY

Illustrative embodiments provide a cloud-based broker which functions as a universal entry point for connectivity of B2B partner platforms to the applications of an enterprise. Configuration and connectivity protocol changes to organizational applications, to B2B gateways and/or to application programming interface (API) gateways of an organization can be addressed at the cloud-based broker without a need to modify individual external partner platforms, thereby overcoming one or more of the above-noted difficulties of conventional practice associated with maintaining connectivity of enterprise applications to a heterogeneous population of vendor platforms.

In one embodiment, an apparatus comprises at least one processing platform including a plurality of processing devices. The processing platform is configured to abstract a plurality of partner platforms and a plurality of enterprise applications to extract a plurality of connectivity parameters associated with respective ones of the plurality of partner platforms and the plurality of enterprise applications, to manage connections between the plurality of partner platforms and the plurality of enterprise applications by implementing the plurality of connectivity parameters, wherein the implementing provides the plurality of partner platforms with centralized access to the plurality of enterprise applications via a broker layer, to select one or more connectivity parameters of the plurality of connectivity parameters to be used in connection with routing of data between a given partner platform of the plurality of partner platforms and a given enterprise application of the plurality of enterprise applications, and to route the data between the given partner platform and the given enterprise application via the broker layer using the selected one or more connectivity parameters.

In some embodiments, one or more APIs are executed to perform the abstracting. In addition, the connectivity parameters can be extracted from a plurality of properties files of the respective ones of the plurality of partner platforms and the plurality of enterprise applications. Examples of connectivity parameters include but are not necessarily limited to transport protocols, messaging methods, conditions and notification settings.

Messages may be routed through alternate transmission paths based on whether a transaction limit for a given transmission path will be reached. For example, in one or more embodiments, a time remaining until the transaction limit for the given transmission path is reached is predicted based on a rate of transactions for the given transmission path, a number of completed transactions for the given transmission path and/or historical transaction limit data for the given transmission path. Additionally, one or more machine learning algorithms may be used to predict whether a transaction limit for a given transmission path will be reached.

These and other illustrative embodiments include, without limitation, apparatus, systems, methods and computer program products comprising processor-readable storage media.

BRIEF DESCRIPTION OF THE DRAWINGS

FIG. 5 illustrates a methodology for providing enterprise partner and application connectivity with a cloud broker layer, according to an illustrative embodiment.

FIG. 6 illustrates a screenshot including example pseudocode for a control API, according to an illustrative embodiment.

FIG. 7 illustrates a screenshot including example pseudocode for a transport API, according to an illustrative embodiment.

FIG. 8 illustrates a screenshot including example pseudocode for a profile API, according to an illustrative embodiment.

FIG. 9 illustrates a screenshot including example pseudocode for a visibility API, according to an illustrative embodiment.

FIGS. 10A-10J show example pseudocode for interfacing between a cloud broker and queues, according to an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Dell® Boomi®, Amazon Web Services® (AWS), Google Compute Engine® (GCE), and Microsoft Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

Figure 1:
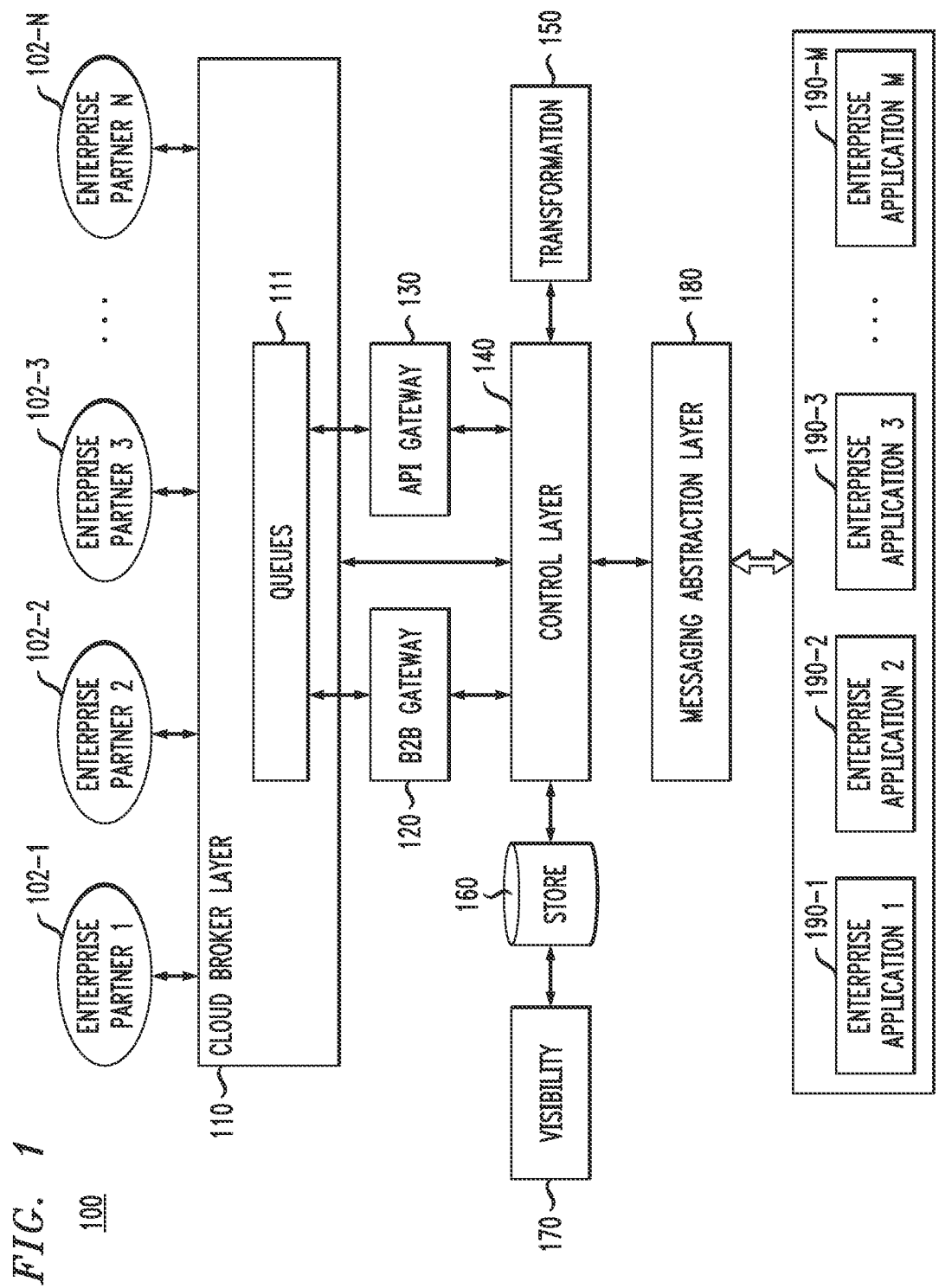
FIG. 1 illustrates an information processing system implementing a cloud broker layer, according to an illustrative embodiment.

FIG. 1 shows an information processing system 100 implementing a cloud broker layer 110 in accordance with an illustrative embodiment. Information processing system 100 comprises a plurality of enterprise partner platforms 102 (e.g., Enterprise Partner 1, Enterprise Partner 2, Enterprise Partner 3 . . . Enterprise Partner N, respectively denoted by reference numerals 102-1, 102-2, 102-3 . . . 102-N) operatively coupled (e.g., via one or more communication networks) to the cloud broker layer 110. The one or more communication networks may comprise any of a variety of different types of networks, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks. The variables M, N and other similar index variables herein such as K, L and P are assumed to be arbitrary positive integers greater than or equal to two.

The platforms 102 are associated with respective B2B partners that an enterprise may rely on for various goods and/or services, such as, but not necessarily limited to, materials for production of a given product, manufacturing services, data storage, cloud services and operational services such as accounting and payroll. Non-limiting examples of B2B partners include suppliers, contract manufacturers, trading partners and comma separated value (CSV) partners providing, for example, spreadsheet and tabular data services. The partner platforms 102 comprise processing platforms and processing platform elements as defined herein, and various software and applications associated with respective B2B partners to an enterprise.

The information processing system 100 includes a plurality of enterprise applications 190 (e.g., Application 1, Application 2, Application 3 . . . Application M, respectively denoted by reference numerals 190-1, 190-2, 190-3 . . . 190-M). The applications 190 comprise, for example: (i) platforms for business process automation, which enable communication between different software systems used in an enterprise (e.g., Microsoft® BizTalk®); (ii) platforms to provide programming language interoperability (e.g., Microsoft® .NET framework); (iii) platforms to provide support for web applications through, for example, servlets, struts or Java® Server Pages (JSPs) (e.g., Java® applications); (iv) platforms for programming using certain programming languages (e.g., C, C++) to create, for example, computer applications, firmware, verification software, test code and/or simulators for various applications and hardware products; (v) platforms to provide service-oriented architecture (SOA) services including, but not necessarily limited to, distributed application components incorporating discovery, access control, data mapping and security features; and (vi) platforms to provide microservices including, but not necessarily limited to, collections of loosely coupled, fine-grained and parallelized services implementing lightweight protocols.

The applications 190 may be operatively coupled (e.g., via one or more communication networks) to one or more backend services (not shown). In accordance with the present disclosure, the one or more backend services can include, for example, database management systems, such as database servers for storing and retrieving data as requested by applications (e.g., SAP® database (SAP America Inc., Newtown Square, PA) and Oracle® database (Oracle Corporation, Redwood City, Calif.)). The backend services may also include third-party customer relationship management (CRM) applications providing enterprises with an interface for case and task management (e.g., Salesforce.com® (Salesforce.com Inc., San Francisco, Calif.), and cloud environments for enterprise solutions including, for example, information management, compliance, and B2B integration (e.g. OpenText™ Cloud (Open Text SA ULC, Halifax, Nova Scotia, Canada)). Another example of a backend service is WebMethods® (Software AG USA, Inc., Reston, Va.) which can be used for integrating and managing applications, mobile devices, services, big data and APIs.

The information processing system 100 further includes a messaging abstraction layer (MAL) 180 operatively coupled (e.g., via one or more communication networks) to the applications 190. Applications 190 are configured to send and/or receive messages with data via the MAL 180. The MAL 180 provides a centralized interface between a plurality of message-oriented middleware (MOM) servers (not shown) and the plurality of applications 190. The MAL 180 is compatible with each of the one or more MOM servers, and each of the plurality of applications 190. An application 190 receives an appropriate payload from the MAL 180 based on the logic of the application 190.

A MAL 180 includes functionality to permit an application to seamlessly have access to and switch between multiple MOM servers. According to one or more embodiments, the MAL 180 provides applications with seamless connections to and from heterogeneous MOM servers. The MOM servers permit data exchange between distributed applications by sending and receiving messages. In a non-limiting example, the MOM servers can respectively correspond to different MOM servers from different sources, which run different software and have different capabilities. Some non-limiting examples of MOM servers which may be compatible with the MAL 180 are IBM® MQ (International Business Machines Corporation, Armonk, N.Y.), RabbitMQ® (Pivotal Software, Inc., San Francisco, Calif.), Apache™ ActiveMQ® and Apache™ Kafka® (Apache Software Foundation, Wakefield, Mass.).

Figure 2:
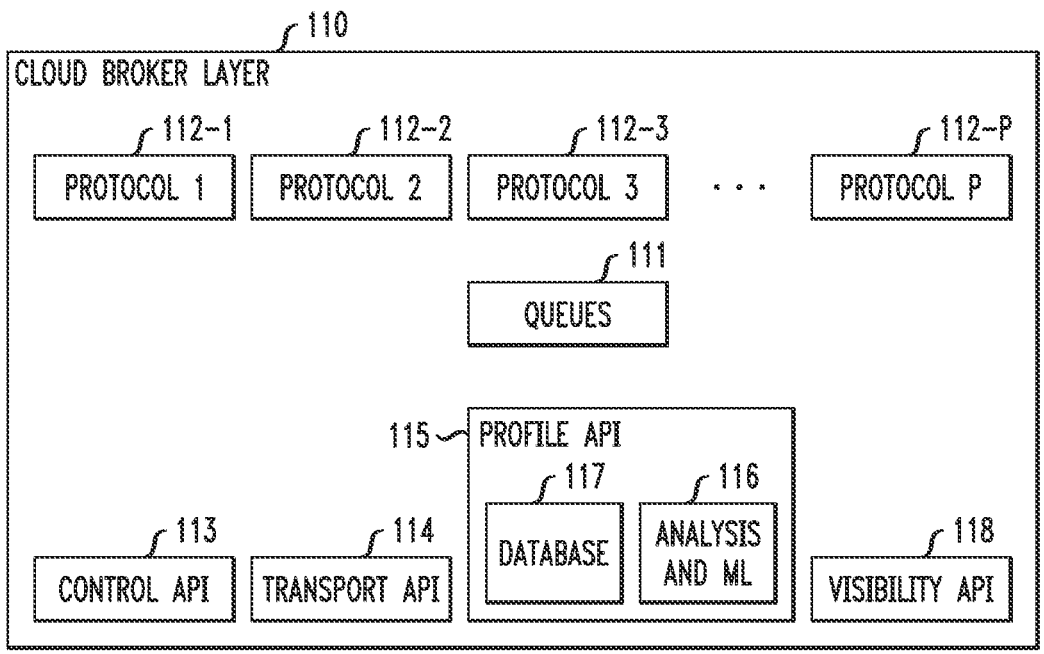
FIG. 2 illustrates an exemplary architecture for a cloud broker layer, according to an illustrative embodiment.

The cloud broker layer 110 comprises a cloud-based computing environment as described herein above. Referring to FIGS. 1 and 2, the cloud broker layer 110 includes a plurality of queues 111. In connection with the routing of messages between the plurality of partner platforms 102 and the plurality of enterprise applications 190, the cloud broker layer 110 organizes the messages in a plurality of queues 111.

FIGS. 10A, 10B, 10C, 10D, 10E, 10F, 10G, 10H, 10I and 10J respectively show example pseudocode for 10 steps for interfacing between a cloud broker and queues. The pseudocode flow corresponds to a Message Queuing (MQ) application using a base MQ API. The pseudocode 1001 (FIG. 10A) refers to a first step of loading host, channel, port and queue name from a properties file. The source of the properties file (e.g., configuration file) can be in various directories and can be passed in as program arguments. These initial three lines of the pseudocode 1001 starting with "FileInputStream" allow a program to accept a full path location of a properties file passed in as program arguments. The pseudocode 1002 (FIG. 10B) refers to a second step of setting an "MQEnvironment" based on the loaded values from step 1.

The pseudocode 1003 (FIG. 10C) refers to a third step of instantiating an instance of a queue manager. Queue managers provide queuing services to applications including, but not necessarily limited to, changing object attributes according to received commands, generating events (e.g., trigger and instrumentation events) when certain conditions are satisfied, placing messages in the correct queue based on commands, and providing notifications when messages are not able to be placed in the appropriate queue.

The pseudocode 1004 (FIG. 10D) refers to a fourth step of defining open options for a put/get operation. The pseudocode 1005 (FIG. 10E) refers to a fifth step of instantiating an instance of MQ PutMessage Options, and the pseudocode 1006 (FIG. 10F) refers to a sixth step of setting an MQ message header to persistent, Unicode Transformation Format-8 (UTF-8) and string format.

The pseudocode 1007 (FIG. 10G) and 1008 (FIG. 10H) refer to respective seventh and eighth steps of instantiating an access object to q, and the MQ API to put to q. By way of explanation, "defaultQ" in pseudocode 1007 is an object of an "MQQueue" class representing a queue, which includes methods to "Put( )" and "Get( )" messages to and from the queue, based on properties corresponding to the attributes of a queue (e.g., similar to "MQPUT" and "MQGET" commands used in connection with MQ coding). Accessing a queue attribute property, or issuing a Put( ) or Get( ) method call, implicitly opens the queue (e.g., similar to the "MQOPEN" command used in connection with MQ coding). Destroying an MQQueue object implicitly closes the queue (similar to the "MQCLOSE" command used in connection with MQ coding), which explains the pseudocode 1008, where "defaultQ.put( )" method is used to put a message. The pseudocode 1009 (FIG. 10I) and 1010 (FIG. 10J) refer to respective ninth and tenth steps of closing the output queue and disconnecting the queue manager.

As an alternative to using a base MQ API, an implementation flow using an enterprise MQ API interface may comprise less lines of codes than with the base MQ API. For example, pseudocode in connection with using an enterprise MG API may include the following:

Connect( );
openQueue( );
putMessage( )/getMsg( ).

The enterprise MQ API permits developers easy access an MQ infrastructure and enables programmatic processing of data using the same enterprise MQ API, independent of underlying software vendor MQ API libraries.

Referring back to FIG. 1, the cloud broker layer 110 is operatively coupled (e.g., via one or more communication networks) to a B2B gateway 120 and an API gateway 130. The B2B gateway 120 controls data exchange corresponding to a B2B transaction between B2B partners, and provides a centralized point for transformation of multiple data sources through interoperability standards such as, for example, Extensible Markup language (XML), commerce XML (cXML) and electronic data interchange (EDI). Other features of B2B gateway 120 include security control, provision of an MQ footprint, facilitating collaboration between supply chain partners through all phases of a transaction (e.g., ordering, manufacturing and shipping), and providing enterprises with enhanced visibility and pro-active control over applications. The API gateway 130 routes requests to the appropriate microservices, performs protocol translation, monitors the progress of transactions between the enterprise applications 190 and partners 102 (e.g., whether transactions are completed) and detects transaction failures. If there are detected failures, the API gateway 130 may return cached or default data.

Referring to FIG. 2, by implementing a plurality of APIs 113, 114, 115 and 118, which are configured to abstract a plurality of partner platforms 102 and a plurality of enterprise applications 190, an enterprise is able to seamlessly connect and communicate with a plurality of different types of B2B partner platforms 102 through different gateways 120 and 130. As noted herein, in order to interact with B2B partners, conventional methods require enterprises to maintain relatively large capacity B2B partner-specific client libraries on their application servers, which consume relatively large amounts of processing power. Instead, according to one or more embodiments, in order to conduct B2B transactions with an enterprise, enterprise partners need only to obtain relatively lightweight client libraries (low capacity and processing power requirements) including a small number of APIs (e.g., APIs 113, 114, 115 and/or 118) with extensions. The cloud broker layer 110 including the plurality of APIs 113, 114, 115 and 118 allows an enterprise to seamlessly switch between B2B service and gateway providers running on different platforms.

As shown in FIG. 2, the cloud broker layer 110 includes a control API 113, a transport API 114, a profile API 115 and a visibility API 118. The control API 113 includes logic to route messages to appropriate gateways (e.g., gateways 120 and 130) based on one or more connectivity parameters including, but not necessarily limited to, one or more messaging methods such as pass-through messaging and synchronous communication, or conditions, such as requires translation. Referring to FIG. 6, a screenshot 600 includes example pseudocode for a control API specifying pass-through messaging and synchronous communication. The control API 113 further includes one or more extensions to provide functionalities to remove and/or insert user-defined message headers before real payload data and to modify coded character set identifiers. The one or more extensions optimize control functions given to application developers to process their data.

The transport API 114 selects an appropriate transport protocol, based, for example, on the transport protocol for a given gateway through which a message is transmitted. Non-limiting examples of different transport protocols include Applicability Statement 2 (AS2), MQ, Secure File Transfer Protocol (SFTP), File Transfer Protocol Secure (FTPS), HyperText Transfer Protocol Secure (HTTPS), Remote Desktop Protocol (RDP), Transmission Control Protocol (TCP), User Datagram Protocol (UDP) and File-Copy protocol. A gateway (e.g., gateway 120, 130) may support one or more of these different transport protocols.

Referring to FIG. 7, a screenshot 700 includes example pseudocode for a transport API specifying a plurality of transport protocols. Using the transport API 114, the cloud broker 110 is configured to manage multiple transport protocols 112 (e.g., Protocol 1, Protocol 2, Protocol 3 . . . Protocol P, respectively denoted by reference numerals 112-1, 112-2, 112-3 . . . 112-P) of the plurality of partner platforms 102 and the plurality of enterprise applications, and determine which transport protocols to use for transmitting messages between the partner platforms 102 and the applications 190 through one or more gateways 120, 130.

The profile API 115 performs intelligent routing using one or more machine learning (ML) techniques to proactively route message payloads to alternative targets when a transaction threshold for a given transmission path is within range of being breached. For example, the profile API 115 predicts the time remaining until the transaction limit for the given transmission path is reached. According to one or more embodiments, the prediction is based on the following equation (1):

$$T_r = \frac{L - n_t}{R} \quad (1)$$

here $T_r$ is a time remaining until a transaction limit for a transmission path is reached, L is a limit on transactions for the transmission path (e.g., daily transaction limit or other limit based on a different timeframe), $n_t$ is number of completed transactions for the transmission path, and R is a rate of transactions in the transmission path. In addition, by solving for R in equation (1), a target rate ($R_t$) to keep the number of transactions less than L can be calculated as in equation (2).

$$R_t = \frac{L - n_t}{T_r} \quad (2)$$

Limiting transactions over a given transmission path can reduce licensing costs when middleware vendor licensing costs depend on a volume of transactions generated through a particular channel on a platform. For example, if a transaction limit is met or exceeded, costs may increase significantly.

According to one or more embodiments, the profile API 115 predicts the time remaining until the transaction limit for the given transmission path is reached using one or more machine learning algorithms, which are based on historical transaction limit data for the given transmission path. Analysis and machine learning logic 116 of the profile API 115 is used to execute the one or more machine learning models. Machine learning models include, but are not necessarily limited to, linear regression models, neural networks, Long Short Term Memory (LSTM) networks, Support Vector Machine (SVM), Multilayer Perceptron (MLP), deep learning models, decision trees and/or clustering based on a training set. The training set includes, for example, the historical transaction limit data for the given transmission path, which may be periodically updated based on modifications to the transmission paths and their resulting thresholds. The historical transaction limit data and training sets may be stored in a database 117. In connection with a LSTM network, a timestamp normalized Poisson process to identify intent to change activity as per equation (3) may be implemented.

$$P(x, \mu) = \frac{e^{-\mu}\mu^x}{x!} \quad (3)$$

The profile API 115 further includes one or more extensions to provide the ability to execute a "class/object" replacement at runtime to load values of properties files dynamically at runtime. This feature mitigates delay in deployment time if certain attributes of a profile are not correct and need to be modified. For example, if some parameter values need to be changed, a conventional way to make such changes would be to change and rebuild the code, and then deploy the rebuilt code. This new enhancement will call a Java® class loader and pass in new parameter values at runtime, thereby skipping the conventional steps of changing, rebuilding and deploying.

Referring to FIG. 8, a screenshot 800 includes example pseudocode for a profile API 115, which specifies extracted profile connectivity parameters such as, for example, partner name, delivery path and partner id, on which a transmission path is based.

The visibility API 118 routes data to an appropriate visibility engine (e.g., visibility layer 170) for a particular view, such as, a global view. The visibility API 118 allows end-to-end (E2E) visibility of tapped transactions to be traced from each hub through which a transaction flows based on the captured data. Connectivity parameters affecting routing to the appropriate visibility engine 118 include, but are not necessarily limited to, correlation and notification parameters. Since the visibility API 118 performs tracking and tracing, the API requires parameters, such as, for example, a unique global transaction identifier (PO #) to correlate transactions from different segments, and notification settings to issue alerts when certain threshold conditions are breached or met. For example, referring to FIG. 9, a screenshot 900 includes example pseudocode for a visibility API 118, which specifies a Boolean correlation requirement. The visibility API 118 further includes one or more extensions to allow a developer to selectively capture any attributes as defined in a transaction object, which optimizes specific E2E visibility tracing for current enterprise partners.

The extensions allow developers to further capture correlated data in different transactions based on unique id.

Figure 3:
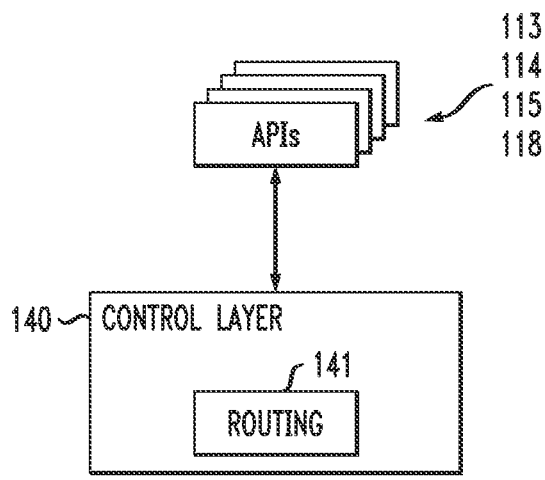
FIG. 3 illustrates an exemplary architecture for a control layer, according to an illustrative embodiment.

The control layer 140 is operatively coupled (e.g., via one or more communication networks) to the cloud broker layer 110, and between the B2B and API gateways 120, 130 and the MAL 180. The control layer 140 is also operatively coupled to transformation layer 150, data store 160 and visibility layer 170. The control layer 140 analyzes transactions between the enterprise applications 190 and partners 102 to manage and determine the validity of transactions. For example, referring to FIG. 3, the control layer 140 includes a routing component 141, which determines whether to route and routes messages to and from the B2B and API gateways 120, 130, and to and from the MAL 180. Based on the analysis of the transaction, the control layer 140 may route a message payload to the transformation layer 150 so that the transformation layer 150 can transform the message payload from a source format to a format readable by a target of the message. According to one or more embodiments, the control layer 140 implements one or more of the APIs 113, 114, 115 and 118 in order to determine routing of data over one or more transmission paths through one or more gateways 120, 130. The control layer 140 also determines whether data should be stored in a data store 160.

The control layer 140 further determines whether a transaction satisfies conditions to be made visible to users via visibility layer 170. For example, based on an affirmative request or command made by a user and/or based on one or more pre-programmed conditions, some transactions between the enterprise applications 190 and partners 102 may be made visible through the visibility layer 170 so that the transactions can be tracked and alerts issued when certain transaction benchmarks (e.g., manufacturing completed, order shipped, order delivered) are satisfied or not met. According to one or more embodiments, the control layer 140 implements the visibility API 118 in order to determine whether a transaction satisfies conditions to be made visible to users via visibility layer 170.

Figure 4:
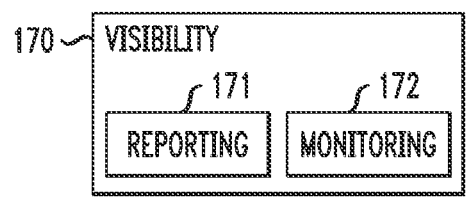
FIG. 4 illustrates an exemplary architecture for a visibility component, according to an illustrative embodiment.

Referring to FIG. 4, the visibility layer 170 includes monitoring logic 172 to track transaction progress. The visibility layer 170 further includes reporting logic 171 to generate a user interface including a dashboard with the payload of a transaction, including information, such as, for example, details and progress of an order. Auditors may rely on the information obtained through the visibility later 170 to follow-up with B2B partners regarding whether requests can or will be fulfilled.

The information processing system 100 including the cloud broker layer 110 described in connection with FIGS. 1-4, is assumed to comprise a plurality of processing devices each having a processor coupled to a memory. One or more such processing devices may be implemented at least in part utilizing one or more virtual machines, containers or other types of virtualization infrastructure. Examples of processing platforms implementing the information processing system 100 will be described below in conjunction with FIGS. 11 and 12.

At least one of the processing platforms of system 100 may more particularly comprise at least a portion of a cloud-based data center or other cloud-based computer system, although other types of processing platforms may be used in other embodiments. For example, in some embodiments, at least one of the processing platforms may comprise an enterprise-based computer system rather than a cloud-based computer system. A given cloud-based implementation of a particular one of the processing platforms illustratively includes commercially-available cloud infrastructure, such as an allocated portion of a Dell® Boomi® or AWS system. Other examples of cloud-based systems that can be used to implement one or more processing platforms of system 100 include Google Cloud Platform (GCP) and Microsoft Azure®.

A cloud-based system of this type illustratively comprises a Platform-as-a-Service (PaaS) layer overlying an Infrastructure-as-a-Service (IaaS) layer. The IaaS layer may comprise a plurality of virtual machines supporting application containers of the PaaS layer. For example, host devices in such an embodiment illustratively correspond to respective ones of the virtual machines of the IaaS layer.

Each of the one or more processing platforms of system 100 may be associated with one or more system users, partners or vendors. The term "user," "partner" or "vendor" in this context and elsewhere herein is intended to be broadly construed so as to encompass, for example, human, hardware, software or firmware entities, as well as various combinations of such entities. At least some of the system users, partners or vendors can be associated with various processing devices through which those users, partners or vendors interface with various system components. These processing devices associated with system users, partners or vendors can include, for example, desktop, laptop or tablet computers, mobile telephones, or other types and arrangements of devices that support user interfaces to functionality of system 100.

Storage arrays associated with processing platforms of system 100 may comprise, for example, at least one VNX® or Symmetrix VMAX® storage array from Dell EMC of Hopkinton, Massachusetts. Other types of storage arrays that may be used in illustrative embodiments include scale-out all-flash content addressable storage arrays such as XtremIO™ storage arrays, also from Dell EMC.

The operation of the information processing system 100 will now be described in further detail with reference to the flow diagram of the illustrative embodiment of FIG. 5. This figure illustrates a process 500 that includes steps 502, 504, 506 and 508, and is suitable for use in system 100, but is more generally applicable to other types of information processing systems including the B2B partner and enterprise application connectivity as described herein.

In step 502, a plurality of partner platforms and a plurality of enterprise applications are abstracted to extract a plurality of connectivity parameters associated with respective ones of the plurality of partner platforms and the plurality of enterprise applications. As used herein, "to abstract," "abstracting" and/or "abstracted" refers to the process of removing certain details or attributes in the study of objects, platforms, applications, data, software or other computing environments or configurations in order to more closely attend to other details of interest. One or more application programming interfaces are executed to perform the abstracting. The plurality of connectivity parameters can be extracted from a plurality of properties files of the respective ones of the plurality of partner platforms and the plurality of enterprise applications. The connectivity parameters may include, for example, a plurality of transport protocols, a plurality of messaging methods, a plurality of conditions, a plurality of notification settings, and other parameters such as, for example, host name, port name, user id and password. Values of one or more properties files may be dynamically loaded at runtime.

In step 504, connections between the plurality of partner platforms and the plurality of enterprise applications are managed by implementing the plurality of connectivity parameters. The implementing provides the plurality of partner platforms with centralized access to the plurality of enterprise applications via a broker layer. The broker layer is cloud-based.

In step 506, one or more connectivity parameters of the plurality of connectivity parameters are selected to be used in connection with routing of data between a given partner platform of the plurality of partner platforms and a given enterprise application of the plurality of enterprise applications, and, in step 508, the data is routed between the given partner platform and the given enterprise application via the broker layer using the selected one or more connectivity parameters.

A determination can be made whether to route one or more messages of a plurality of messages through at least one alternate transmission path of a plurality of transmission paths based on a time remaining until a transaction limit for a given transmission path of the plurality of transmission paths is reached.

In illustrative embodiments, the time remaining until the transaction limit for the given transmission path is reached may be predicted based on a rate of transactions for the given transmission path, a number of completed transactions for the given transmission path and/or historical transaction limit data for the given transmission path. Additionally, the time remaining until the transaction limit for the given transmission path is reached may be predicted using one or more machine learning algorithms.

One or more APIs of the cloud broker layer can be used to selectively capture one or more attributes defined in a transaction object, and insert and/or remove one or more user-defined headers into and/or from message payload data.

In one or more embodiments, a plurality of messages may be routed to one or more gateways based given ones of the plurality of connectivity parameters, wherein the one or more gateways comprise a B2B gateway and an API gateway.

The particular processing operations and other system functionality described in conjunction with the flow diagram of FIG. 5 are presented by way of illustrative example only, and should not be construed as limiting the scope of the disclosure in any way. Alternative embodiments can use other types of processing operations for implementing the B2B partner and enterprise application connectivity as described herein. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated connectivity processes within a given information processing system.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be noted that the particular arrangements illustrated in FIGS. 1 through 9, and in FIGS. 10A through 10J are presented by way of illustrative example only, and should not be construed as limiting in any way. As noted above, the described functionality for B2B partner and enterprise application connectivity can be implemented using additional or alternative components, and in other processing contexts. Accordingly, a wide variety of different connectivity arrangements can be used in other embodiments. In addition the components of the system 100 are not necessarily limited to their corresponding systems as illustrated, and may be incorporated into other ones of the illustrated systems where appropriate.

The illustrative embodiments described above provide significant advantages over conventional arrangements. For example, a cloud broker implementing a plurality of APIs in accordance with one or more embodiments provides a common standard entry point into applications of an enterprise. Further, the embodiments eliminate configuration changes to external partner platforms when there are changes made to enterprise applications or changes made within the B2B or API gateways used by an enterprise. Moreover, unlike conventional techniques, which require heavy weight vendor specific client libraries consuming large amounts of computing resources, the embodiments rely on a cloud broker layer implementing lightweight APIs that avoid unwanted consumption of storage space and processing power.

Moreover, illustrative embodiments can provide significant advantages by permitting machine learning based transaction routing based on transaction thresholds, and which proactively determines transmission paths before channel transaction limits are reached.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement at least portions of the B2B partner and enterprise application connectivity functionality as disclosed herein will now be described in greater detail with reference to FIGS. 11 and 12. Although described in the context of system 100, these platforms may also be used to implement at least portions of other information processing systems in other embodiments.

Figure 11:
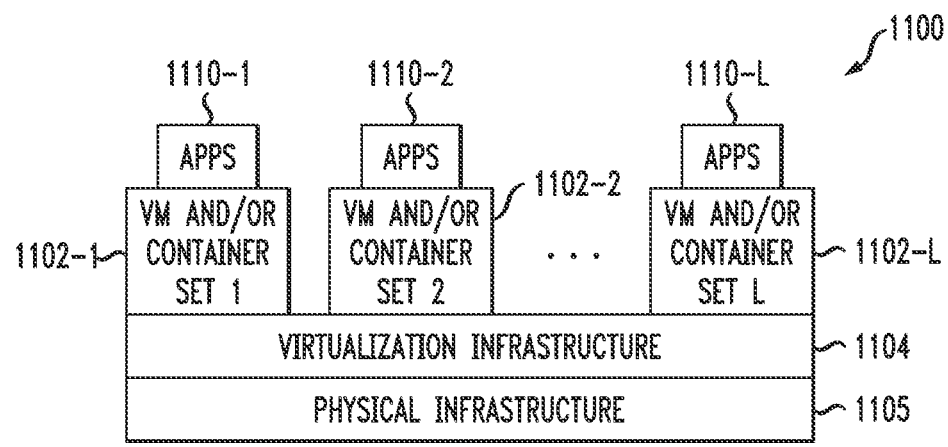
FIGS. 11 and 12 show examples of processing platforms that may be utilized to implement at least a portion of an information processing system in illustrative embodiments.
Figure 12:
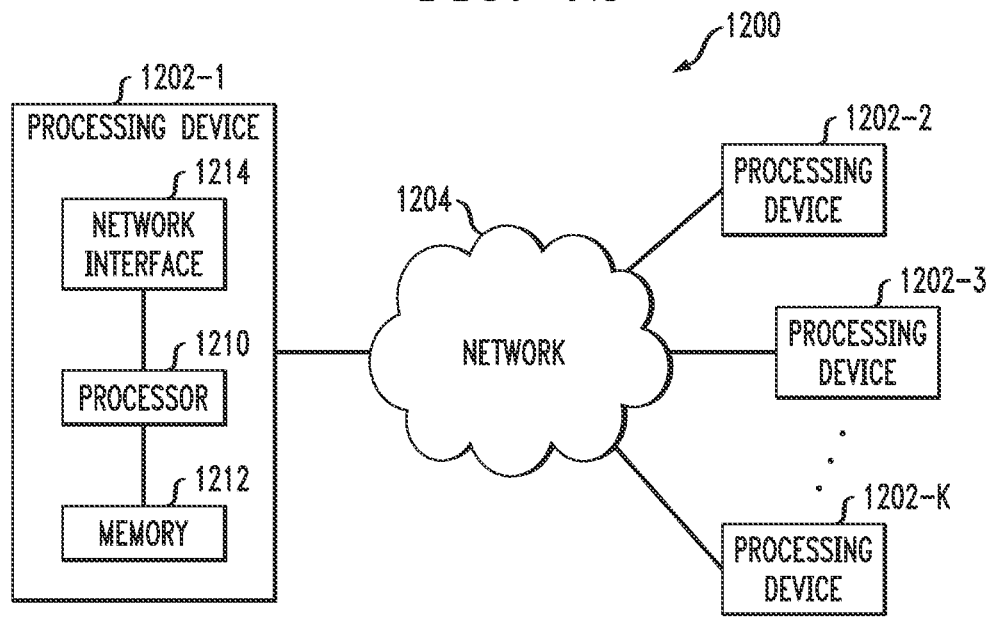

FIG. 11 shows an example processing platform comprising cloud infrastructure 1100. The cloud infrastructure 1100 comprises a combination of physical and virtual processing resources that may be utilized to implement at least a portion of the information processing system 100 or 200. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide B2B partner and enterprise application connectivity functionality of the type described above at least in part utilizing processes running on the VMs. For example, different ones of the VMs can implement different portions of the cloud broker layer 110.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide B2B partner and enterprise application connectivity functionality of the type described above at least in part utilizing processes running on the containers. For example, a container host device supporting multiple containers of one or more container sets can implement different portions of the cloud broker layer 110.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a CPU, a graphics processing unit (GPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of an information processing system providing B2B partner and enterprise application connectivity functionality as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems comprising different arrangements of processing platforms, networks, broker layers, B2B partners and enterprise applications. Also, the particular configurations of system and device elements and associated B2B partner and enterprise application connectivity processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform being configured:
to abstract a plurality of partner platforms and a plurality of enterprise applications to extract a plurality of connectivity parameters associated with respective ones of the plurality of partner platforms and the plurality of enterprise applications;
wherein the plurality of connectivity parameters are extracted at least in part from a plurality of properties files of the respective ones of the plurality of partner platforms and the plurality of enterprise applications;
to manage connections between the plurality of partner platforms and the plurality of enterprise applications by implementing the plurality of connectivity parameters, wherein the implementing provides the plurality of partner platforms with centralized access to the plurality of enterprise applications via a broker layer;
to select first connectivity parameters of the plurality of connectivity parameters to be used in connection with routing of first data between a given partner platform of the plurality of partner platforms and a first enterprise application of the plurality of enterprise applications;
to select second connectivity parameters of the plurality of connectivity parameters to be used in connection with routing of second data between the given partner platform of the plurality of partner platforms and a second enterprise application of the plurality of enterprise applications;
to route the first data between the given partner platform and the first enterprise application via the broker layer using the selected first connectivity parameters; and
to route the second data between the given partner platform and the second enterprise application via the broker layer using the selected second connectivity parameters;
wherein at least portions of the first connectivity parameters are different than at least portions of the second connectivity parameters; and
wherein the broker layer implements one or more application programming interfaces to enable the given partner platform to switch between the first and second enterprise applications.

2. The apparatus of claim 1 wherein said at least one processing platform is further configured to determine whether to route one or more messages of a plurality of messages through at least one alternate transmission path of a plurality of transmission paths based on a time remaining until a transaction limit for a given transmission path of the plurality of transmission paths is reached.

3. The apparatus of claim 2 wherein said at least one processing platform is further configured to predict the time remaining until the transaction limit for the given transmission path is reached using one or more machine learning algorithms.

4. The apparatus of claim 2 wherein said at least one processing platform is further configured to predict the time remaining until the transaction limit for the given transmission path is reached based on a rate of transactions for the given transmission path.

5. The apparatus of claim 2 wherein said at least one processing platform is further configured to predict the time remaining until the transaction limit for the given transmission path is reached based on a number of completed transactions for the given transmission path.

6. The apparatus of claim 2 wherein said at least one processing platform is further configured to predict the time remaining until the transaction limit for the given transmission path is reached based on historical transaction limit data for the given transmission path.

7. The apparatus of claim 1 wherein said at least one processing platform is further configured to route a plurality of messages to one or more gateways based on given ones of the plurality of connectivity parameters.

8. The apparatus of claim 7 wherein the one or more gateways comprise a business-to-business gateway and an application programming interface gateway.

9. The apparatus of claim 1 wherein the broker layer is cloud-based.

10. The apparatus of claim 1 wherein said at least one processing platform is configured to execute the one or more application programming interfaces to perform the abstracting.

11. The apparatus of claim 1 wherein the plurality of connectivity parameters comprise at least one of a plurality of transport protocols, a plurality of messaging methods, a plurality of conditions and a plurality of notification settings.

12. The apparatus of claim 1 wherein said at least one processing platform is further configured to dynamically load values of the plurality of properties files at runtime.

13. The apparatus of claim 1 wherein said at least one processing platform is further configured to selectively capture one or more attributes defined in a transaction object.

14. The apparatus of claim 1 wherein said at least one processing platform is further configured to at least one of insert and remove one or more user-defined headers into and from message payload data.

15. A method comprising:
abstracting a plurality of partner platforms and a plurality of enterprise applications to extract a plurality of connectivity parameters associated with respective ones of the plurality of partner platforms and the plurality of enterprise applications;
wherein the plurality of connectivity parameters are extracted at least in part from a plurality of properties files of the respective ones of the plurality of partner platforms and the plurality of enterprise applications;
managing connections between the plurality of partner platforms and the plurality of enterprise applications by implementing the plurality of connectivity parameters, wherein the implementing provides the plurality of partner platforms with centralized access to the plurality of enterprise applications via a broker layer;
selecting first connectivity parameters of the plurality of connectivity parameters to be used in connection with routing of first data between a given partner platform of the plurality of partner platforms and a first enterprise application of the plurality of enterprise applications;
selecting second connectivity parameters of the plurality of connectivity parameters to be used in connection with routing of second data between the given partner platform of the plurality of partner platforms and a second enterprise application of the plurality of enterprise applications;
routing the first data between the given partner platform and the first enterprise application via the broker layer using the selected first connectivity parameters; and
routing the second data between the given partner platform and the second enterprise application via the broker layer using the selected second connectivity parameters;

wherein at least portions of the first connectivity parameters are different than at least portions of the second connectivity parameters; and wherein the broker layer implements one or more application programming interfaces to enable the given partner platform to switch between the first and second enterprise applications.

16. The method of claim 15 further comprising executing the one or more application programming interfaces to perform the abstracting.

17. The method of claim 15 further comprising determining whether to route one or more messages of a plurality of messages through at least one alternate transmission path of a plurality of transmission paths based on a time remaining until a transaction limit for a given transmission path of the plurality of transmission paths is reached.

18. A computer program product comprising a non-transitory processor-readable storage medium having stored therein program code of one or more software programs, wherein the program code when executed by at least one processing platform causes said at least one processing platform:

to abstract a plurality of partner platforms and a plurality of enterprise applications to extract a plurality of connectivity parameters associated with respective ones of the plurality of partner platforms and the plurality of enterprise applications;

wherein the plurality of connectivity parameters are extracted at least in part from a plurality of properties files of the respective ones of the plurality of partner platforms and the plurality of enterprise applications;

to manage connections between the plurality of partner platforms and the plurality of enterprise applications by implementing the plurality of connectivity parameters, wherein the implementing provides the plurality of partner platforms with centralized access to the plurality of enterprise applications via a broker layer;

to select first connectivity parameters of the plurality of connectivity parameters to be used in connection with routing of first data between a given partner platform of the plurality of partner platforms and a first enterprise application of the plurality of enterprise applications;

to select second connectivity parameters of the plurality of connectivity parameters to be used in connection with routing of second data between the given partner platform of the plurality of partner platforms and a second enterprise application of the plurality of enterprise applications;

to route the first data between the given partner platform and the first enterprise application via the broker layer using the selected first connectivity parameters; and to route the second data between the given partner platform and the second enterprise application via the broker layer using the selected second connectivity parameters;

wherein at least portions of the first connectivity parameters are different than at least portions of the second connectivity parameters; and wherein the broker layer implements one or more application programming interfaces to enable the given partner platform to switch between the first and second enterprise applications.

19. The computer program product of claim 18 wherein the program code further causes said at least one processing platform to determine whether to route one or more messages of a plurality of messages through at least one alternate transmission path of a plurality of transmission paths based on a time remaining until a transaction limit for a given transmission path of the plurality of transmission paths is reached.

20. The computer program product of claim 18 wherein the program code further causes said at least one processing platform to dynamically load values of the plurality of properties files at runtime.

* * * * *